(12) United States Patent
Breuer et al.

(10) Patent No.: US 6,939,634 B2
(45) Date of Patent: Sep. 6, 2005

(54) FUEL CELL SYSTEM HAVING TWO REFORMER UNITS FOR CATALYTIC DECOMPOSITION

(75) Inventors: Norbet Breuer, Ditzingen (DE); Oliver Marquardt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 10/205,659

(22) Filed: Jul. 25, 2002

(65) Prior Publication Data

US 2003/0031901 A1 Feb. 13, 2003

(30) Foreign Application Priority Data

Jul. 27, 2001 (DE) .......................................... 101 36 768

(51) Int. Cl.[7] .......................... H01M 8/04; H01M 8/18
(52) U.S. Cl. ............................. 429/20; 429/24; 429/26; 429/19; 429/17; 429/13
(58) Field of Search ............................. 429/20, 17, 13, 429/24, 26, 19

(56) References Cited

U.S. PATENT DOCUMENTS

| 3,962,411 | A | | 6/1976 | Setzer et al. |
| 4,473,622 | A | | 9/1984 | Chludzinski et al. |
| 5,221,586 | A | * | 6/1993 | Morimoto et al. ............. 429/20 |
| 6,209,494 | B1 | | 4/2001 | Manikowski, Jr. et al. |
| 2003/0039871 | A1 | * | 2/2003 | Christen et al. .............. 429/17 |
| 2003/0116472 | A1 | * | 6/2003 | Wieland et al. ............. 208/138 |

FOREIGN PATENT DOCUMENTS

| EP | 0 691 701 | 1/1996 |
| GB | 1 407 019 | 9/1972 |

OTHER PUBLICATIONS

Callahan M.A. en Haas W.R. "Hydrocarbon fuel conditioner for a 1.5 KW fuel power plant", Proceedings of the Power Sources Symposium (1976), 27, 180–2, ISSN 0079–4457.
Banochie J.G. en Clow C.G., "Modified partial oxidation of hydrocarbons for use in acid fuel cells," Energy Conversion (1973), 13(2), 67–74, ISSN: 0013–7480.
Chemical Abstracts Plus 2000, Accession No. 2000; 447801, Doc. No. 133:91834, Muradiov, N.Z., "CO2–free production of hydrogen by catalytic paralysis of hydrocarbon fuels for transportation" in: Hydrogen Energy Progress XII, Proceedings of the World Hydrogen Energy Conference 12th Buenos Aires Jun. 21–26, 1988, 1997, ISSN 0360–3199.
Poirier, M. G. (1997): "Catalytic decomposition of natural gas to hydrogen for fuel cell applications," Int. J. Hydrogen Energy 22 (4), 429–433*.

* cited by examiner

Primary Examiner—Patrick Ryan
Assistant Examiner—Angela J. Martin
(74) Attorney, Agent, or Firm—Kenyon & Kenyon

(57) ABSTRACT

A fuel cell system including at least two reformer units for catalytic decomposing a starting material stream into at least one intermediate product and one hydrogen-rich fuel stream of a fuel cell unit, in which each reformer unit converts the starting material stream into an end product stream in at least one first operating phase and into the intermediate product in a second operating phase using an auxiliary material stream. The fuel cell system provides its continuous generation of a hydrogen-rich fuel stream from hydrocarbons for mobile and/or stationary fuel cell applications using at least one heat exchanger unit to exchange heat between the reformer units.

12 Claims, 1 Drawing Sheet

FUEL CELL SYSTEM HAVING TWO REFORMER UNITS FOR CATALYTIC DECOMPOSITION

FIELD OF THE INVENTION

The present invention relates to a fuel cell system having at least two reformer units for catalytic decomposition.

BACKGROUND INFORMATION

Fuel cells may convert chemically bound energy directly into electrical energy. Fuel cells presently may consume hydrogen and oxygen and may convert these elements into the environmentally safe end product water.

It is believed that methods of partial oxidation, autothermal reforming as well as steam reforming have been used in fuel cell applications to produce a hydrogen-rich gaseous stream of hydrocarbons. Gas purification stages may be provided to reduce the carbon monoxide content in the gaseous stream to approximately 100 ppm, for example, for a low-temperature fuel cell. Several process steps may be provided for this purpose that may result in considerable process and configuration expense. In addition, this may cause relatively high costs for process development, production, and a comparatively high need for maintenance of the total system.

The method of catalytic decomposition has been used for the production of black carbon. In catalytic decomposition, hydrocarbons, methane or the like in particular, may be primarily converted into hydrogen and carbon in the form of black carbon. This reaction may proceed at low pressures and may occur with heterogeneous catalysis in order to accelerate the endothermic decomposition reaction according to equation 1:

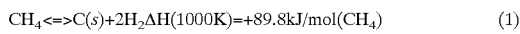
$$CH_4 <=> C(s) + 2H_2 \Delta H(1000K) = +89.8 kJ/mol(CH_4) \quad (1)$$

If no continuous removal of black carbon is ensured, the carbon being deposited in the reactor according to equation 1 may be required to be removed periodically in order to reduce or remove the black carbon deposit on the catalyst. Thus, the hydrogen-rich gas mixture may be produced in a first operating phase and the black carbon may be removed in a second operating phase in order to prevent the reactor from becoming clogged.

Black carbon may be removed, for example, by oxidation reactions according to equations 2 and 3:

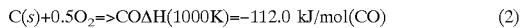
$$C(s) + 0.5O_2 => CO \Delta H(1000K) = -112.0 \text{ kJ/mol(CO)} \quad (2)$$

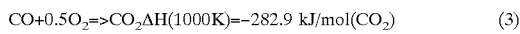
$$CO + 0.5O_2 => CO_2 \Delta H(1000K) = -282.9 \text{ kJ/mol}(CO_2) \quad (3)$$

As an alternative, black carbon may be oxidized through a fluid stream containing steam:

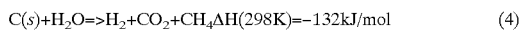
$$C(s) + H_2O => H_2 + CO_2 + CH_4 \Delta H(298K) = -132 kJ/mol \quad (4)$$

As research reports may show, efficient carbon decomposition may be attained. Industrially, this reaction may be used for carbon burn-off in steam reforming processes; if an oxygen-containing gas is added, the burn-off may proceed even more easily according to equations (2) and (3).

Heretofore, catalytic decomposition for fuel cell applications may have only been implemented in the laboratory (see Poirier, M. G. (1997): "Catalytic decomposition of natural gas to hydrogen for fuel cell applications," Int. J. Hydrogen Energy 22 (4), 429–433). In this connection, the periodic oxidation of the black carbon deposits was investigated with changeover between two separate reactors.

SUMMARY OF THE INVENTION

An object of an exemplary embodiment of the present invention includes providing a fuel cell system having at least two reformer units for catalytic decomposition, which may improve the continuous generation of a hydrogen-rich fuel stream from hydrocarbons for mobile and/or stationary fuel cell applications.

Accordingly, a feature of a fuel cell system according to the present invention is that at least one heat exchanger unit is provided to exchange heat between the reformer units.

A heat exchanger unit according to an exemplary embodiment of the present invention may use the heat released by the oxidation reactions according to equations 2 and 3 for the endothermic decomposition reaction according to equation 1. As an alternative or in combination with this exemplary method, thermal energy of a heating unit or the like may be used by the heat exchanger unit of the present invention if required.

A heat exchanger unit according to an exemplary embodiment of the present invention may utilize energy, for example, between two or more reformer units, the decomposition reaction and the oxidation reactions proceeding concurrently at least in part in physically or materially separated reactors or reformer units. This may provide efficient integration of the thermal energies.

The operating temperature during the first operating phase in the corresponding reformer unit may be comparatively high due to the heating by the other reformer unit, as a result of which the decomposition reaction may occur in a thermodynamically desirable manner.

In one exemplary embodiment of the present invention, at least the modular units and the heat exchanger unit may be configured as one structural unit, arranged in one common housing in particular. Thereby, a compact implementation of the present invention may be performed. A relatively compact fuel cell system according to an exemplary embodiment of the present invention may be suitable for applications in which a comparatively low volume is desirable, such as for mobile or stationary fuel cell applications, for example.

DETAILED DESCRIPTION

Figure 1:
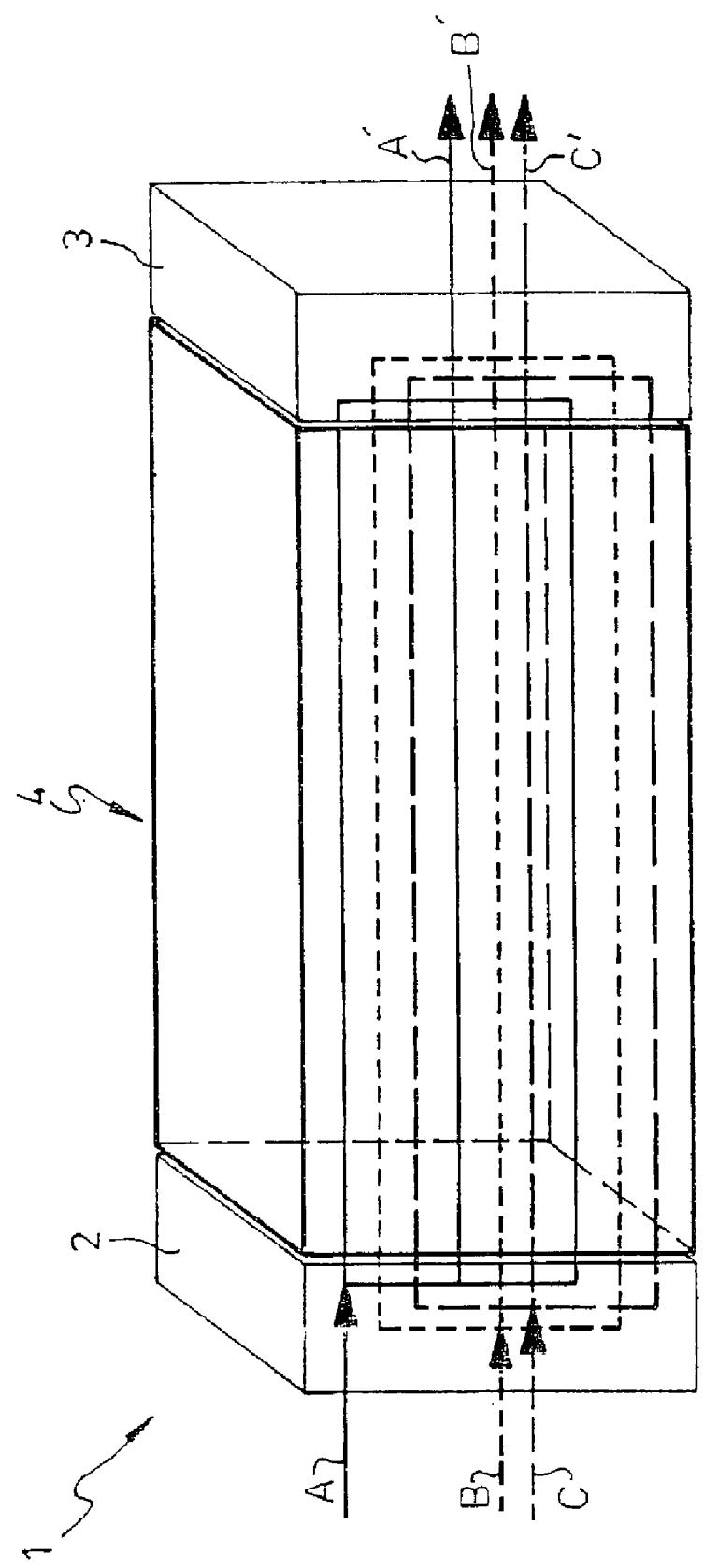
FIG. 1 shows an exemplary embodiment of the present invention.

FIG. 1 shows a schematic configuration of a modular unit 1 according to the present invention. Modular unit 1 includes in particular a distributor 2, a collector 3, and a reactor unit 4.

In a manner not shown, distributor 2 and collector 3 have, for example, distributing valves and distributing elements, whereby a largely uniform distribution of material streams A, B, C to be supplied or collection of material streams A', B', C' to be carried off may be implemented.

Schematically shown reactor unit 4 has in particular numerous, comparatively small reactors or channels through which material streams A, B, C flow. If required, the reactors or channels are configured in such a manner that the conversion of material streams A, B, C and the concomitant changes of corresponding operating parameters such as pressure or the like are taken into account.

For example, material stream A of the starting material stream is, e.g., natural gas, material stream B of the auxiliary stream such as, e.g., air or nearly pure oxygen, and material stream C a flushing agent stream or a coolant stream. In this operating phase of modular unit 1, for example, material stream A flows through a corresponding assembly of reactors, i.e., a group of reactors, material stream B flows through a second group and material stream C flows through a third group.

As a result of the reactions or flushing and/or heating of material streams A, B, C, modified material streams A', B', C' flow out of modular unit 1. In this example, material stream A' is the hydrogen-rich fuel stream, material stream B' the end product stream, rich in particular in carbon monoxide or carbon dioxide, and material stream C' is the inert gas or flushing gas, to which small amounts of hydrogen or oxygen and/or possibly small amounts of carbon are added under certain operating conditions, or material stream C' is a heated coolant stream.

At a later time, material stream B is present, for example, as a starting material stream, material stream C as an auxiliary material stream, and material stream A as a flushing or coolant stream. Accordingly, modified material streams A', B', C' may also be formed as correspondingly different material streams than in the example cited above.

Again at a later time, material stream C, for example, is present as a starting material stream, etc. Generally, the times of the operating phases of the different groups or reactors may be of equal length and/or of different lengths. An adaptation may be made to the mode of operation of the fuel cell unit or the like.

In a particular operating case in which, for example, the fuel cell unit has a relatively high demand for a hydrogen-rich fuel stream, material streams A, B, C may be present simultaneously or nearly simultaneously as a starting material stream such as natural gas or the like.

Generally, the fuel cell unit has one or more fuel cells. All presently available kinds of fuel cell may be used for this purpose. When alcohols are used as a starting material, carbon monoxide-tolerant fuel cells may be provided such as, for example, presently available high-temperature fuel cells, known as SOFC's (Solid Oxide Fuel Cells), for example.

If hydrocarbons such as natural gas, gasoline or the like are used, fuel cells that display signs of poisoning in the presence of carbon monoxide may be used, since the method of catalytic decomposition which is implemented using the reformer units or reactors may generate a fuel stream mixture that is extremely low in carbon monoxide and rich in hydrogen, and comparatively expensive fuel stream purification stages connected downstream are made dispensable. Fuel cells of this type may be, for example, presently available "low-temperature fuel cells" such as PEM (Polymer Electrolyte Membrane) fuel cells or the like.

If required, a post-cleaning of the generated fuel stream may also occur in certain applications using, for example, carbon monoxide methanation or the like:

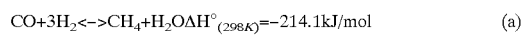

$$CO+3H_2 <-> CH_4+H_2O \Delta H°_{(298K)}=-214.1 kJ/mol \quad (a)$$

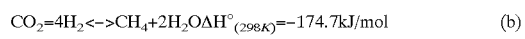

$$CO_2+4H_2 <-> CH_4+2H_2O \Delta H°_{(298K)}=-174.7 kJ/mol \quad (b)$$

Since the proportion of $CO_2$ in the hydrogen-rich fuel stream may be considered negligible during the decomposition phase in the proposed catalytic decomposition method, undesirable secondary reaction (b) may proceed at a negligible rate. This may be a desirable feature compared to other methods of partial oxidation, autothermal reformation, or steam reformation in which a methanation procedure step may result in losses of the hydrogen concentration according to equation (b). An additional desirable feature compared to the customarily used method of selective oxidation for secondary CO purification may be that no oxygen-containing gas needs to be added to the secondary CO purification stage.

At least one flushing device may be provided to flush the reformer units with a flushing agent stream. For example, a chemically inert fluid such as nitrogen or combustion gases, for example, from the fuel cell unit, or the like may be used as a flushing agent.

The flushing device may be used for flushing in a third operating phase between the first operating phase and the second operating phase of a reformer unit, such as, for example, after the first, hydrogen-generating operating phase. The flushing phase between the two operating phases of the reformer units may ensure that the danger of a undesirable hydrogen-oxygen reaction may be prevented or eliminated, i.e., the uncontrolled reaction of hydrogen and oxygen with the release of a relatively high amount of energy may be prevented. This measure may result in a substantial increase in operating safety of a fuel cell system according to an exemplary embodiment of the present invention.

As an alternative to or in combination with a flushing device, the geometry of the fluid-carrying lines may be configured in such a manner that the requirement for flushing may be reduced or completely eliminated. This may be the case when the cross-sectional area of the fluid-carrying lines is configured in such a manner that it may not be possible to reach the ignition energy required for an explosion due to a low line cross-section. The cross-sectional area to carry a fluid may be distributed to several cross-sections separated from each other geometrically in order to keep the pressure drop in the system low.

As an alternative or in combination with the flushing device, at least one cooling device may be provided to cool the reformer units with a coolant stream. This measure may, for example, bring about a relatively great temperature reduction in one individual or several reformer units so that the production of the hydrogen-rich fuel may be deliberately reduced or stopped in the corresponding reformer units. This may eliminate the requirement for an inertization between the two operating phases, i.e., flushing with the two flushing agents mentioned above.

The reformer units may be cooled with the coolant stream in a third or fourth operating phase of the reformer units. If required, the cooling device may be configured both as a flushing device at the same time so that heat to be dissipated and the remaining hydrogen-rich reformate may be withdrawn from the corresponding reformer unit.

A cooling device may be used that may materially separate the coolant stream from the other material streams such as the starting material stream, the auxiliary material stream and/or the flushing agent stream. Cooling elements such as cooling coils, cooling channels or the like may be provided for this purpose. The cooling channels or the like may be configured to be similar to the reformer units.

For example, air, water, various brines, the auxiliary agent stream, the starting material stream and/or the flushing agent stream may be provided as a coolant for the cooling device. In particular, the fuel streams may be preheated so that the decomposition reaction as well as the oxidation reaction may be accelerated or improved, if required. This may permit an efficient operating mode of the fuel cell system. This may improve the dynamic characteristics in the production of the hydrogen-rich fuel stream, which may be desirable in mobile fuel cell applications.

At least one activatable distributing unit may be provided for the time-independent distribution of material streams to be supplied to the individual reformer units or cooling device. Therefore, the material streams may be supplied, i.e., the starting material stream, auxiliary material stream, flushing agent stream and/or the coolant stream to be distributed as required to the individual reformer units or to the cooling device, separately and time-independent. This measure may provide operating phases of the respective reformer units or of the cooling device of varying length so that varied operating phases or intended reactions may be adjusted to the requirements or the operation of the fuel cell system.

For example, a comparatively short flushing phase may be provided to flush the reformer units. The second operating phase or the oxidation reactions may be adjusted temporally to the reduction of the black carbon or largely complete elimination of black carbon in the corresponding reformer unit with the aid of the corresponding reformer unit.

Moreover, the production of the hydrogen-rich fuel stream for the fuel cell unit may be significantly increased if required, for example, if several or possibly nearly all reformer units produce hydrogen-rich fuel at least for a relatively short period of time.

The distributing unit may include at least one distributing element to distribute a material stream to be supplied to the cooling device or several reformer units. One corresponding distributing element may be provided per material stream to be supplied. Thus, several or numerous reformer units and/or cooling elements may be operated in the same operating phase. The distributing element may permit the respective material stream to be distributed, such as, for example, from a collecting line or the like to the various reformer units or cooling elements.

At least one activatable collecting unit may be provided for the time-independent collection of material streams to be performed from the cooling device or the individual reformer units. This measure may permit the same material streams to be correspondingly collected from several or numerous reformer units and/or cooling elements, such as, for example, in one collecting line or the like.

The distributing unit and the collecting unit may be configured so that the flow through the reformer units may occur during the decomposition or the first operating phase and/or the oxidation or second operating phase in a largely uniform manner. For this purpose, the distributing unit may be arranged diagonally opposite the collecting unit.

The distributing and/or collecting unit may be directly integrated into the reformer unit. As an alternative, the distributing and/or collecting unit may be manufactured separately to simplify the manufacture of the reformer unit and joined to be fluid-tight to the outside.

The collecting unit may include at least one collecting element to collect a material stream to be carried off from the cooling device or several reformer units.

Corresponding to the aforementioned distributing element, a corresponding collecting element or one collecting element per material stream to be carried off may be provided so that a collection of individual, comparatively small material streams into a relatively large material stream may be provided when several cooling elements or reformer units are operated simultaneously in the same operating phase. The relatively large, hydrogen-rich material stream may be supplied to the fuel cell unit, for example, via a collecting line or the like.

Several cooling elements and reformer units may be combined into a group by the distributing element and collecting element, respectively, the same material flow flowing through each reformer element and cooling element of this group. Thus, they may be in the same operating phase.

For example, a first group may be operated in the first operating phase, a second group in the second operating phase, a third group in the flush phase and/or a fourth group in the cooling phase. According to an exemplary embodiment of the present invention, the various operating phases may operate for different time periods, so that individual operating phases may be completely eliminated under certain operating conditions. The sum of the operating times of each group or each reformer unit may be equal, the cooling device being an exception to this if required.

The reformer units may have surface-enlarging structures to improve the reactions occurring in the reformer units or reactors. For example, the catalytically active material to be provided may, if required, be applied to a substrate of the respective reformer unit by electroplating.

The substrate of the reformer unit may have a relatively rough surface, which may essentially enlarge the effective surface of the reformer unit. For example, if metals are used as the base material, the surface of the reformer unit may be roughened by etching methods or the like.

As an alternative, the catalyst substrate may be made from a tubular filament structure, which may be introduced into a sheath. The filaments, made of $SiO_2$, for example, may be sheathed with a porous ceramic cover layer into which the catalytically active metal is introduced.

Palladium, rhodium, nickel and/or cobalt in the form of a metal or alloy may be used as a catalytically active material of the reformer units.

Refractory materials such as metal alloys, metals and/or ceramics may be used as a material for the heat exchanger unit according to an exemplary embodiment of the present invention.

The surface-enlarging structures may be configured as tube elements, honeycomb elements and/or channel elements having in particular a square or rectangular cross-section. For example, a reformer element may include numerous individual tube elements or may have numerous channels or the like, through which the material streams to be supplied flow. As an alternative or in combination with this approach, the reformer units may be configured as comparatively small tube elements or honeycomb elements or the like. If required, these reformer elements or reactors may have a hydraulic diameter, for example, of between 0.1 mm and 5 mm.

The structural cross-section may turn out to be an optimum between a pressure drop characteristic with consideration of various operating states (black carbon formation), efficient heat dissipation to avoid overheating and undesirably high temperature gradients, as well as the contradictory requirement for a large surface area/volume ratio due to the heterogeneously catalyzed reactions.

If required, these comparatively small reformer units may be configured as channels which, e.g., are made from tubes, honeycombs, films having in particular a catalytically active coating or from a catalytically active material.

The comparatively small reformer units may be aligned essentially in parallel to each other. When the flow of the heat exchanger unit is guided in a cross-flow pattern, as an alternative, the reformer units or groups of reformer units may be aligned nearly perpendicular to each other.

One volume of a reformer unit may be smaller by a multiple than a volume of the modular unit. This may ensure that comparatively numerous, small reformer units or reactors may be formed, which may provide relatively good dynamic characteristics or a rapid change of the individual operating phases. Primarily the flushing phase may be made relatively short due to the relatively small volume of the reformer units, a relatively small volume of the flushing agent being required.

The end product stream or if required, the flushing agent stream may also be sent to an after treatment. For example, a gas purification stage or the like may be provided for reutilization of the auxiliary material stream or the flushing agent stream.

As an alternative or in combination with this method, a heating unit may also be connected downstream from the corresponding flush streams, catalytic after burning being used to combust the oxidation products carbon monoxide and the air constituent oxygen for energy utilization. The thermal energy obtained in this manner may be used by the heat exchanger unit according to an exemplary embodiment of the present invention for the catalytic decomposition.

The material streams may be guided continuously through the reformer units or reactors. A deliberate discontinuous flow guidance of the material streams may provide a defined cooling of specific reactor regions or the like so that primarily the generation of the hydrogen-rich fuel streams may be specifically controlled or improved and/or stopped.

The heat exchanger unit may be implemented as a plate heat exchanger unit or the like, it being required, for example, to configure each layer or plate as a group of reformer units or reactors to be operated identically. As an alternative or at the same time, the heat exchanger and reactor units may also be combined in the same layers.

Both the distributing unit and the collector unit may be required to be configured so that a largely identical distribution and collection of material streams may be ensured to and from the reformer units and the cooling elements, respectively. Accordingly, these units may be required to be configured according to principles of fluid engineering.

Highly varied hydrocarbons or hydrocarbon mixtures such as gasoline, diesel, methane, as well as alcohols, in particular, methanol, ethanol, or the like may be used as the starting material. Gaseous starting materials or aerosols may be used. Starting materials having a low content of higher molecular weight compounds may be required to be provided.

A control or regulating unit may be used in particular to control or regulate the flow of the material streams, primarily as a function of the demand of the fuel cell unit. An adaptation primarily of the generation of the hydrogen-rich fuel stream to the fuel cell unit or, in the case of mobile applications, to the driving performance may be implemented using a control or regulating unit.

Moreover, at least one sensor may be provided to record an operating parameter of the fuel cell system. For example, the temperature of individual reformer units or individual groups, the flow rate of individual or of all material streams, in particular the quantity of the hydrogen-rich fuel stream to the fuel cell unit, the quality or the composition of a material stream, a measure of deposits or the like determined. These operating parameters may be primarily used for the desirable operating mode of the fuel cell system or of the fuel cell unit via the control and regulating unit.

A example operating temperature of the reformer units or of the reactors may be between 400 and 800 degrees centigrade. If required, a heating unit may be provided primarily for a startup phase of the fuel cell system according to an exemplary embodiment of the present invention. Both electric heating and chemical, in particular catalytic combustion of, for example, a starting material and/or a hydrogen-rich mixture of the fuel cell system may be provided.

The various material streams may flow through the heat exchanger unit in counter flow, cross-flow, and/or parallel flow.

The above described heat exchanger unit or modular unit, which includes at least two reformer units and the heat exchanger unit, may also be provided for applications other than in a fuel cell system.

The following is a list of reference symbols:
1 Modular unit;
2 Distributor;
3 Collector;
4 Reactor unit;
A, A' Material stream;
B, B' Material stream; and
C, C' Material stream.

What is claimed is:

1. A fuel cell system, comprising:
   at least two reformer units for catalytically decomposing a starting material stream into at least one intermediate product and a hydrogen-rich fuel stream of a fuel cell unit, each of the at least two reformer units being arranged to convert the starting material stream into an end product stream the at least one intermediate product in at least one first operating phase and to convert into the at least one intermediate product into an end product stream in a second operating phase using an auxiliary material stream; and
   at least one heat exchanger unit to exchange heat between the at least two reformer units.

2. The fuel cell system of claim 1, wherein the at least two reformer units and the heat exchanger unit are configured as one modular unit.

3. The fuel cell system of claim 1, further comprising:
   at least one flushing device to flush the at least two reformer units with a flushing agent stream.

4. The fuel cell system of claim 1, further comprising:
   at least one cooling device to cool the at least two reformer units using a coolant stream.

5. The fuel cell system of claim 4, further comprising:
   at least one activatable distributing unit to time-independently distribute fuel streams to one of the at least one cooling device and one of the at least two reformer units.

6. The fuel cell system of claim 5, wherein the at least one activatable distributing unit includes at least one distributing element to distribute a material stream to one of the at least one cooling device and more than one of the at least two reformer units.

7. The fuel cell system of claim 4, further comprising:
   at least one activatable collecting unit for time-independently collecting material streams from one of the at least one cooling device and one of the at least two reformer units.

8. The fuel cell system of claim 7, wherein the at least one activatable collecting unit includes at least one collecting element to collect a material stream from one of the at least one cooling device and more than one of the at least two reformer units.

9. The fuel cell system of claim 1, wherein the at least two reformer units include surface-enlarging structures.

10. The fuel cell system of claim 9, wherein the surface-enlarging structures are configured as one of tube elements, honeycomb elements, and channel elements.

11. The fuel cell system of claim 2, wherein a volume of at least one of the at least two reformer units is smaller by a multiple than a volume of the one modular unit.

12. A method for catalytically decomposing a starting material stream into at least one intermediate product and one hydrogen-rich fuel stream of a fuel cell unit having a fuel cell system, the method comprising:

converting the starting material stream into the at least one intermediate product in at least one first operating phase and converting the at least one intermediate product into an end product stream in a second operating phase using at least two reformer units and an auxiliary material stream; and exchanging heat between the at least two reformer units using at least one heat exchanger.

* * * * *